C. F. ZIMMERMAN.
BEDPAN.
APPLICATION FILED APR. 21, 1919.

1,340,680.

Patented May 18, 1920.

WITNESS:
F. C. Baust.

INVENTOR.
Carrie F. Zimmerman;
BY
R. S. Berry,
ATTORNEY.

UNITED STATES PATENT OFFICE.

CARRIE F. ZIMMERMAN, OF TAFT, CALIFORNIA.

BEDPAN.

1,340,680.  Specification of Letters Patent.  Patented May 18, 1920.

Application filed April 21, 1919. Serial No. 291,719.

*To all whom it may concern:*

Be it known that I, CARRIE F. ZIMMERMAN, a citizen of the United States, residing at Taft, in the county of Kern and State of California, have invented new and useful Improvements in Bedpans, of which the following is a specification.

This invention relates to a bed-pan and the principal object thereof is to provide a bed-pan which is adapted to be readily placed beneath and removed from under the buttocks of a person in a recumbent position, so as to afford practically no discomfort to the user in placing and removing the pan.

Another object is to provide the bed-pan with a cover which is adapted to serve a double purpose, namely, as a closure for the pan and to act as a shield when in use.

Other objects will appear hereinafter.

The invention is illustrated in the accompanying drawings, in which.

Figure 1:
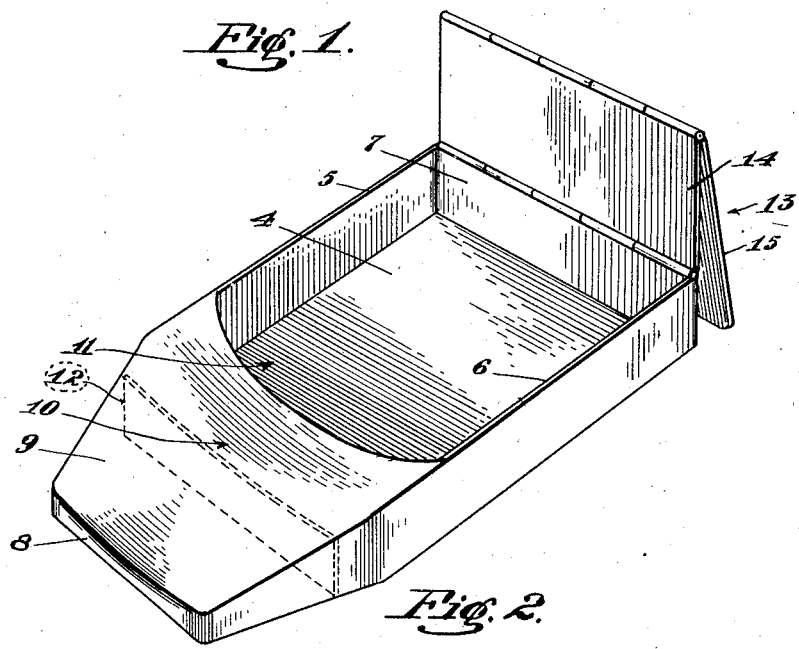
Figure 1 is a perspective view of the bed-pan as seen from the front portion thereof.

In carrying out my invention I provide a pan having a bottom wall 4, tapered side walls 5 and 6, a rear end wall 7, a forward end wall 8 being of a height less than that of the rear wall, and a top wall 9 which extends from the forward end wall 8 such distance therefrom as to form an inclined face 10 on the forward portion of the pan, and an opening 11 extending between the top wall and the rear end wall. The forward end wall 8 is of such height as to form the forward portion of the bed-pan with a narrow edge to which the top wall 9 tapers at a long angle so as to form the pan with a wedge shape in longitudinal section to facilitate placing the bed-pan beneath and removing it from under a person in a recumbent position. The inclined top wall 9 is preferably concave to substantially conform to the back of a person.

Formed in the pan is a transverse partition 12 which extends thereacross beneath the top portion 9 in spaced relation to the upper edge of the top portion so as to form a covered space in the forward portion of the pan contiguous to the lower margin of the opening 11; the basin portion of the pan having a length greater than that of the opening in the pan.

Figure 2:
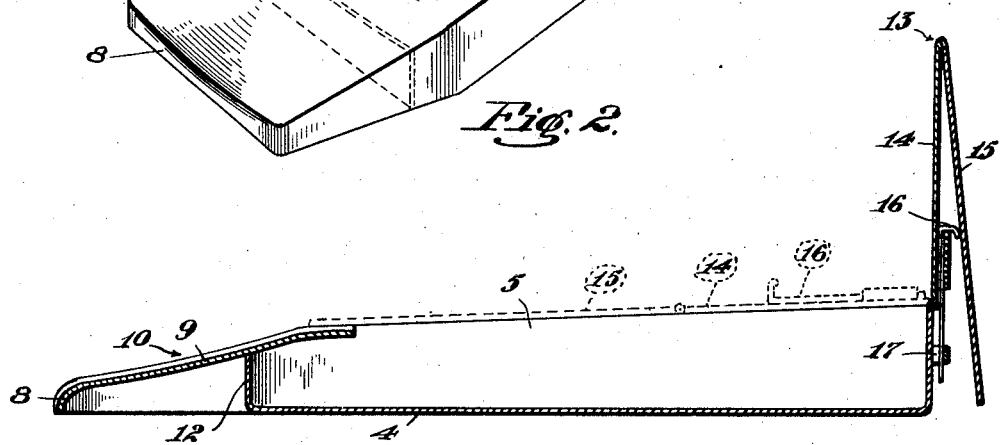
Fig. 2 is a view in longitudinal section of the bed-pan showing the cover in its closed position in dotted lines and indicating in full lines the open position of the cover.
Figure 3:
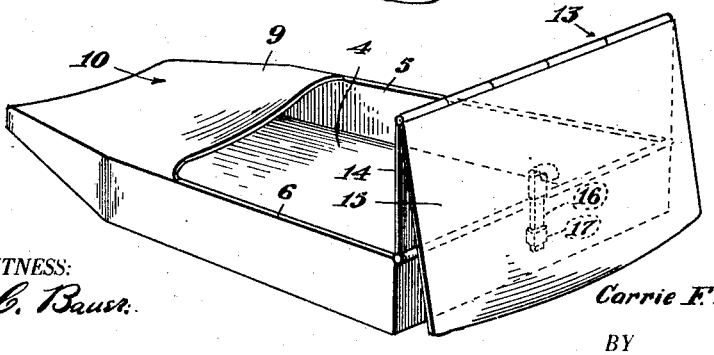
Fig. 3 is a perspective view of the bed-pan as seen from the rear portion thereof showing the manner of holding the cover in its shielding position.

Hinged to the upper edge of the rear end of the pan is a cover member 13 which is formed of two plates 14 and 15 hinged together; the plate 14 being hinged to the wall 7, and the plate 15 hinged to the upper edge of the plate 14 so as to fold thereover as indicated in Fig. 2. This cover member is of such size that when it is in its closed position it will extend over and close the opening 11.

Means are provided for holding the inner plate 14 of the cover in a substantially upright position to form a shield, the purpose of which is obvious. This means is here shown as comprising a bolt 16 of any suitable construction slidably mounted on the plate 14 and adapted to be engaged in a keeper 17 on the end wall 7 in such manner as to dispose and hold the plate 14 in an upright position. When the plate 14 is disposed thus, the plate 15 forming the outer portion of the cover may be folded rearwardly. The purpose of forming the cover in the foldable hingedly connected pieces is to afford means whereby a cover of sufficient size to close the opening 11 may also be employed to form a vertical wall in continuation of the end wall 7, and yet not extend sufficiently high thereabove as to interfere with or engage the limbs when the pan is in use.

I claim:

1. A bed-pan comprising a substantially rectangular pan body wedge-shaped in longitudinal section, an inclined top wall at the convergent end of the pan forming a back support, a plate hinged to the rear edge of the pan, means for holding said plate in an upwardly extending position, and a second plate hinged to the first named plate forming therewith a cover for said pan body.

2. In a bed-pan, a pan of a substantially rectangular shape, a cover formed of a pair of plates hingedly connected transversely of the pan, one of which plates is hinged to an end wall of the pan.

3. In a bed-pan, a pan of a substantially rectangular shape, a cover formed of a pair of plates hingedly connected transversely of the pan, one of which plates is hinged to an end wall of the pan, and means for holding the inner hinged portion of said cover in an upwardly extending position to form a shield.

CARRIE F. ZIMMERMAN.